(12) United States Patent
Kim et al.

(10) Patent No.: US 10,941,818 B2
(45) Date of Patent: Mar. 9, 2021

(54) CLUTCH AND COMPRESSOR COMPRISING SAME

(71) Applicant: Hanon Systems, Daejeon (KR)

(72) Inventors: Jung Ki Kim, Daejeon (KR); Suk Jae Chung, Daejeon (KR); Sung Taeg Oh, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 16/327,367

(22) PCT Filed: Feb. 27, 2018

(86) PCT No.: PCT/KR2018/002363
§ 371 (c)(1),
(2) Date: Feb. 22, 2019

(87) PCT Pub. No.: WO2018/155991
PCT Pub. Date: Aug. 30, 2018

(65) Prior Publication Data
US 2019/0368554 A1 Dec. 5, 2019

(30) Foreign Application Priority Data

Feb. 27, 2017 (KR) .......................... 10-2017-0025494
Feb. 26, 2018 (KR) .......................... 10-2018-0022661

(51) Int. Cl.
*F16D 27/06* (2006.01)
*F16D 13/46* (2006.01)
(Continued)

(52) U.S. Cl.
CPC ............ *F16D 27/06* (2013.01); *F04B 39/121* (2013.01); *F16D 13/46* (2013.01); *F16D 27/14* (2013.01);
(Continued)

(58) Field of Classification Search
CPC .......... F16D 27/06; F16D 13/46; F16D 27/14; F16D 27/112; F04B 39/121; F05B 2240/60; F05B 2260/4023
See application file for complete search history.

(56) References Cited

U.S. PATENT DOCUMENTS 4,296,851 A * 10/1981 Pierce ....................... F16D 3/62
192/200
5,897,056 A * 4/1999 Morikawa ............... F24V 40/00
237/12.3 R
(Continued)

FOREIGN PATENT DOCUMENTS

JP 2005-003202 A 1/2005
KR 10-2004-0034191 A 4/2004
(Continued)

OTHER PUBLICATIONS

International Search Report issued in PCT/KR2018/002363 dated Jun. 20, 2018.

*Primary Examiner* — Tinh Dang
(74) *Attorney, Agent, or Firm* — Norton Rose Fulbright US LLP; James R. Crawford (57) ABSTRACT

Disclosed herein are a clutch and a compressor including the same. The clutch includes a hub fastened to a rotary shaft of the compressor to be rotatable together with the rotary shaft in a state in which a position of the hub is fixed, a disk fastened to the hub to be rotatable together therewith, a pulley rotated by power transmitted from a drive source of the compressor, an elastic member for fastening the hub and the disk such that the disk is movable toward or away from the pulley with respect to the hub, a field coil assembly magnetized when electric power is applied thereto to allow the disk and the pulley to come into contact with or separate from each other, and an attenuation member interposed between the elastic member and the disk. Accordingly, it is (Continued)

possible to reduce noise and vibration due to contact and separation between the disk and the pulley by the elastic member and the attenuation member.

13 Claims, 10 Drawing Sheets

(51) Int. Cl.
*F16D 27/14* (2006.01)
*F16D 27/112* (2006.01)
*F04B 39/12* (2006.01)

(52) U.S. Cl.
CPC ... *F05B 2240/60* (2013.01); *F05B 2260/4023* (2013.01)

(56) References Cited

U.S. PATENT DOCUMENTS

| | | | |
|---|---|---|---|
| 6,286,650 B1* | 9/2001 | Tabuchi | F16D 27/112 |
| | | | 192/84.94 |
| 7,017,726 B2* | 3/2006 | Konishi | F16D 27/112 |
| | | | 192/84.961 |
| 10,036,431 B2* | 7/2018 | Fujisawa | F16D 27/112 |
| 10,113,596 B2* | 10/2018 | Nakajima | F16H 55/36 |
| 10,465,755 B2* | 11/2019 | Iha | F16D 13/76 |
| 10,626,931 B2* | 4/2020 | Nakamura | F16D 27/112 |
| 2011/0127136 A1* | 6/2011 | Sakuraba | F16D 27/112 |
| | | | 192/66.31 |

FOREIGN PATENT DOCUMENTS

| | | |
|---|---|---|
| KR | 10-2004-0073687 A | 8/2004 |
| KR | 10-2005-0086276 A | 8/2005 |
| KR | 10-2011-0018699 A | 2/2011 |
| KR | 10-1339809 B1 | 12/2013 |

* cited by examiner

CLUTCH AND COMPRESSOR COMPRISING SAME

This patent application is a national phase under 35 U.S.C. § 371 of International Application No. PCT/KR2018/002363 filed Feb. 27, 2018, which claims priority from Korean Patent Application No. 10-2017-0025494, filed Feb. 27, 2017, and from Korean Patent Application No. 10-2018-0022661, filed Feb. 26, 2018, each of which is hereby incorporated herein by reference in its entirety for all purposes.

TECHNICAL FIELD

The present disclosure relates to a clutch and a compressor including the same, and more particularly, to a clutch that is magnetized and demagnetized for selectively connecting and disconnecting a drive source and a rotary shaft, and a compressor including the same.

BACKGROUND ART

In general, a vehicle is equipped with an air conditioning (A/C) system for cooling/heating the interior thereof. This air conditioning system includes a compressor that is the component of a cooling system and compresses a low-temperature and low-pressure gas-phase refrigerant, introduced from an evaporator, to high temperature and high pressure to send it to a condenser.

As an example of the compressor, there are a reciprocating compressor that compresses a refrigerant according to which pistons reciprocate, and a rotary compressor that compresses a refrigerant while rotating. The reciprocating compressor includes a crank compressor that transmits a driving force from a drive source to a plurality of pistons using a crank, a swash plate compressor that transmits a driving force from a drive source to a rotary shaft installed with a swash plate, and the like, according to the power transmission method from the drive source. The rotary compressor includes a vane rotary compressor that utilizes a rotating rotary shaft and vane, and a scroll compressor that utilizes an orbiting scroll and a fixed scroll.

Such a compressor typically includes a rotary shaft for transmitting a rotational force to a compression mechanism compressing a refrigerant, and a clutch for selectively connecting and disconnecting its drive source (for example, an engine) and the rotary shaft, and is operated by selectively receiving power from the drive source.

Specifically, the compressor includes a casing, a compression mechanism provided inside the casing to compress a refrigerant, a rotary shaft for transmitting a rotational force to the compression mechanism from a drive source (for example, an engine) provided outside the casing, and a clutch for selectively connecting and disconnecting the drive source and the rotary shaft.

Figure 1:
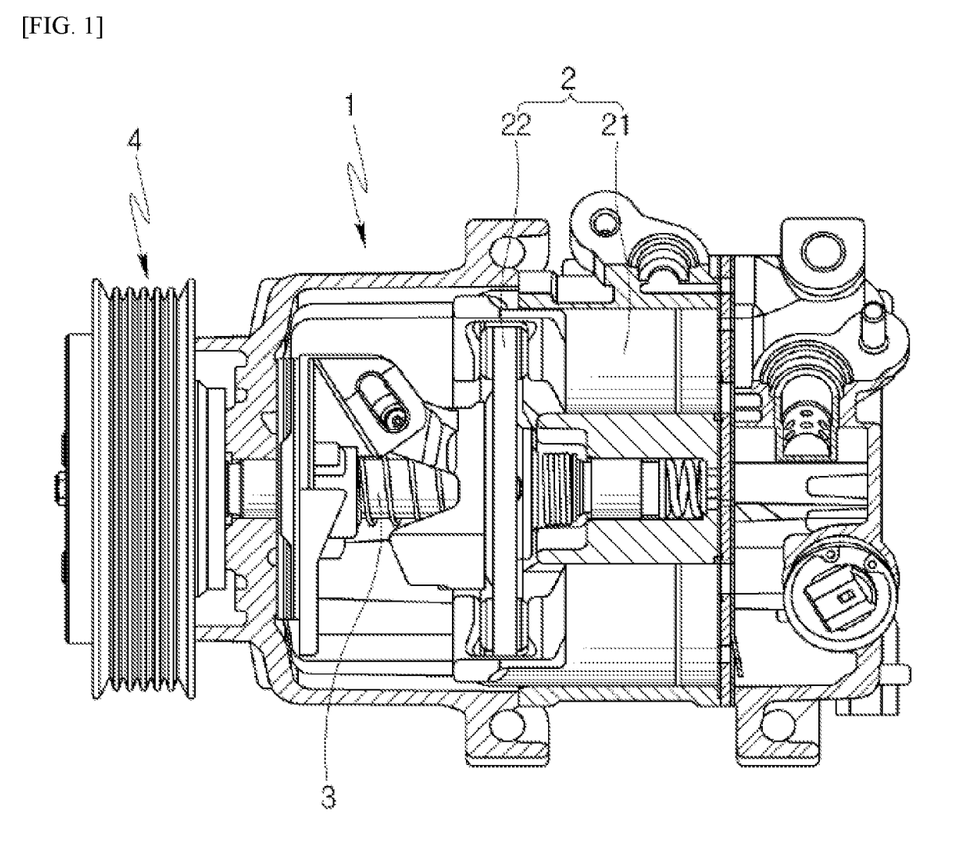
FIG. 1 is a cross-sectional view illustrating a compressor including a clutch.
Figure 2:
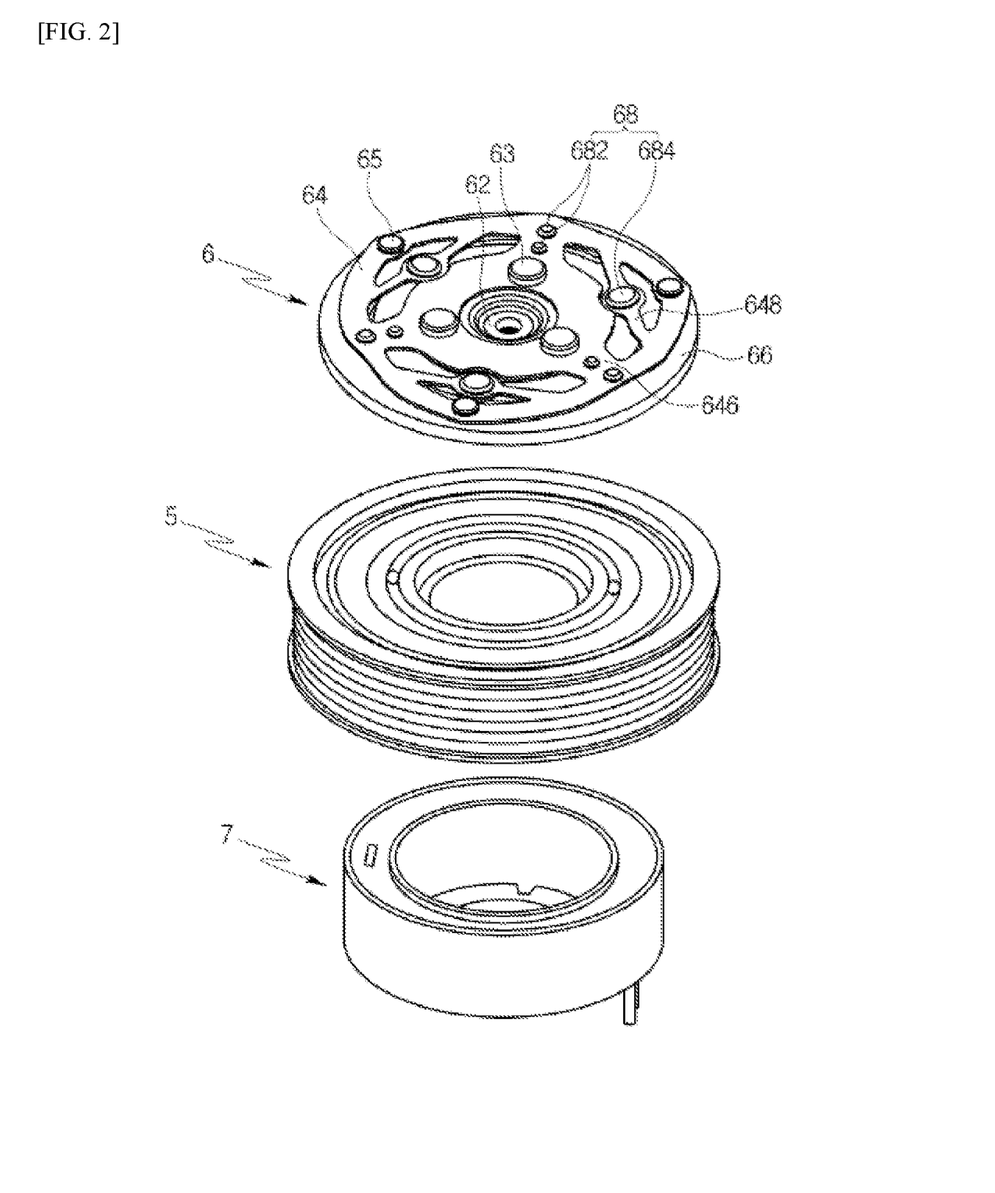
FIG. 2 is an exploded perspective view illustrating a clutch according to an embodiment of the present disclosure.

Referring to FIGS. 1 and 2 of Korean Patent No. 10-1339809, the clutch includes a hub that is fastened to a rotary shaft to be rotatable together therewith, a disk that is fastened to the hub to be rotatable together therewith, a pulley that is rotated by the power transmitted from a drive source, an elastic member that fastens the hub and the disk such that the disk is movable toward or away from the pulley with respect to the hub and applies an elastic force to the disk in a direction in which the disk is away from the pulley, and a field coil assembly that is magnetized when electric power is applied thereto in order to move the disk toward the pulley and make contact between the disk and the pulley.

Here, the hub, the elastic member, and the disk form a so-called disk/hub assembly.

The compressor having the above configuration operates as follows.

That is, the pulley is rotated by the driving force transmitted from the drive source.

In this state, when electric power is applied to the field coil assembly, the disk is moved toward the pulley by the attractive force caused by the magnetic induction of the field coil assembly and comes into contact with the pulley. That is, by coupling between the disk and the pulley, the power of the drive source is transmitted to the rotary shaft through the pulley, the disk, the elastic member, and the hub. The rotary shaft operates the compression mechanism by the power transmitted thereto to compress the refrigerant.

On the other hand, when the application of electric power to the field coil assembly is interrupted, the attractive force by the magnetic induction of the field coil assembly is not generated anymore and the disk is moved away from the pulley by the elastic member to be separated from the pulley. That is, the power transmission from the drive source to the rotary shaft is interrupted. The operation of the compression mechanism is stopped and the compression of the refrigerant is stopped.

However, in the conventional clutch and the compressor including the same, there is a problem in that noise and vibration due to the contact and separation between the pulley and the disk are not attenuated. That is, there is a problem in that considerable noise and vibration are caused when the pulley and the disk collide with each other, the noise and vibration caused when the pulley and the disk rotate together in the state in which they are in contact with each other are transmitted to the compressor, and considerable noise and vibration are caused by the repulsive force of the disk when the pulley and the disk are separated from each other.

DISCLOSURE

Technical Problem

Accordingly, it is an object of the present disclosure to provide a clutch capable of reducing noise and vibration due to contact and separation between a pulley and a disk, and a compressor including the same.

Technical Solution

To accomplish the above object, in accordance with one aspect of the present disclosure, there is provided a clutch that includes a hub fastened to a rotary shaft of a compressor to be rotatable together with the rotary shaft in a state in which a position of the hub is fixed, a disk fastened to the hub to be rotatable together therewith, a pulley rotated by power transmitted from a drive source of the compressor, an elastic member for fastening the hub and the disk such that the disk is movable toward or away from the pulley with respect to the hub, a field coil assembly magnetized when electric power is applied thereto to allow the disk and the pulley to come into contact with or separate from each other, and an attenuation member interposed between the elastic member and the disk, wherein the elastic member and the attenuation member reduce noise and vibration due to contact and separation between the disk and the pulley while reducing noise and vibration transferred from the disk to the elastic member.

The attenuation member may include a first attenuation member coming into contact with the disk and the elastic member during a separation period between the disk and the pulley and separated from one of the disk and the elastic member during a contact period between the disk and the pulley, and a second attenuation member coming into contact with the disk and the elastic member during the contact period and the separation period between the disk and the pulley.

The elastic member may include a first annular portion fastened to the hub, a second annular portion having an annular shape for accommodation of the first annular portion and fastened to the disk, a first bridge extending from the first annular portion to the second annular portion, and a second bridge extending from one side of the second annular portion to the other side of the second annular portion.

The first annular portion may include n first fastening portions arranged circumferentially at regular intervals and fastened to the hub, and n first intermediate portions interposed between the n first fastening portions, the second annular portion may include n second fastening portions arranged circumferentially at regular intervals and fastened to the disk, and n second intermediate portions interposed between the n second fastening portions, an arbitrary one of the n first intermediate portions may radially overlap with an associated one of the n second fastening portions, and an arbitrary one of the n second intermediate portions may radially overlap with an associated one of the n first fastening portions.

The first bridge may consist of n first bridges, and an arbitrary one of the n first bridges may radially overlap with an associated one of the n first fastening portions and an associated one of the n second intermediate portions.

Each of the first bridges may radially extend from the associated first fastening portion to the associated second intermediate portion.

The first attenuation member may be interposed between the disk and at least one of the first bridge and the second intermediate portion.

The first attenuation member may separate a contact surface between the elastic member and the disk toward the pulley from a position such as a contact surface between the elastic member and the hub during the separation period between the disk and the pulley.

The second bridge may consist of n second bridges, and an arbitrary one of the n second bridges may radially overlap with an associated one of the n second fastening portions and an associated one of the n first intermediate portions.

Each of the second brides may extend from one side of the associated fastening portion to the other side thereof in a direction perpendicular to the radial direction thereof.

The second attenuation member may be interposed between the second bridge and the disk.

The second bridge may include an enlarged portion that is wider than the other portions of the second bridge, and the second attenuation member may be formed in the enlarged portion.

The first annular portion may include a tensioning portion concavely formed at a position opposite to the enlarged portion.

In accordance with another aspect of the present disclosure, there is provided a compressor that includes a casing, a compression mechanism provided inside the casing to compress a refrigerant, a rotary shaft for transmitting a rotational force to the compression mechanism from a drive source provided outside the casing, and a power transmission mechanism for selectively connecting and disconnecting the drive source and the rotary shaft, wherein the power transmission mechanism is the clutch.

Advantageous Effects

In a clutch and a compressor including the same according to the present disclosure, the clutch includes a hub that is fastened to the rotary shaft of the compressor to be rotatable together with the rotary shaft in the state in which the position of the hub is fixed, a disk that is fastened to the hub to be rotatable together therewith, a pulley that is rotated by the power transmitted from the drive source of the compressor, an elastic member that fastens the hub and the disk such that the disk is movable toward or away from the pulley with respect to the hub, a field coil assembly that is magnetized when electric power is applied thereto to allow the disk and the pulley to come into contact with or separate from each other, and an attenuation member interposed between the elastic member and the disk. Accordingly, it is possible to reduce noise and vibration due to contact and separation between the disk and the pulley by the elastic member and the attenuation member.

BEST MODE FOR INVENTION

Hereinafter, a clutch and a compressor including the same according to exemplary embodiments of the present disclosure will be described in detail with reference to the accompanying drawings.

Figure 3:
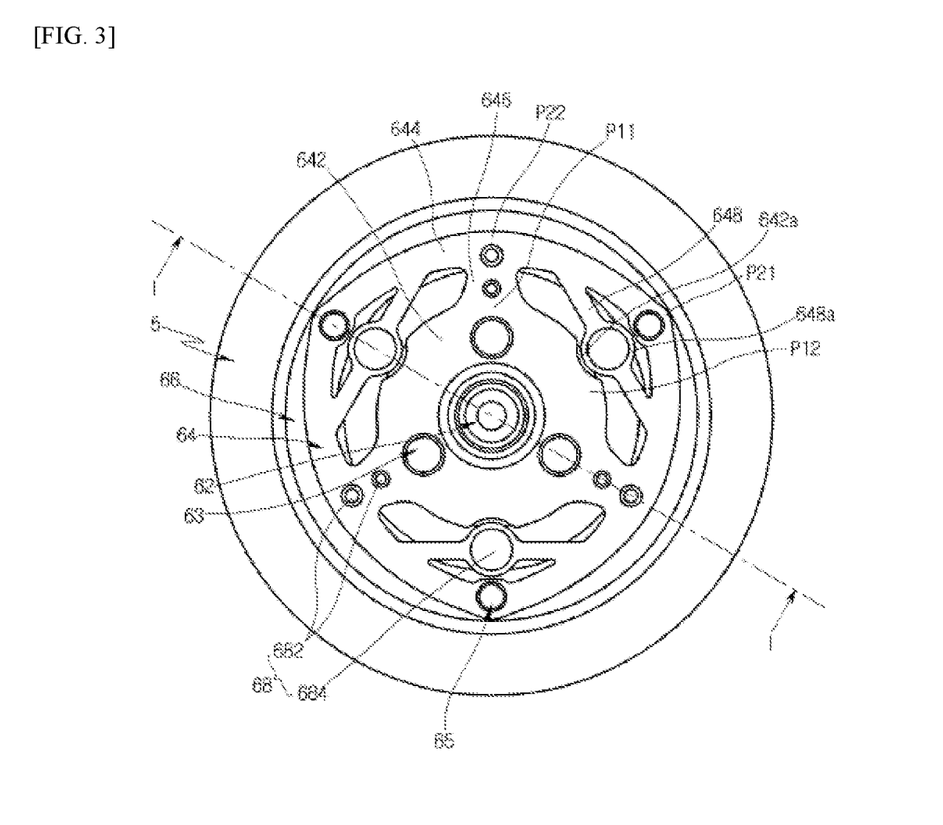
FIG. 3 is a top view illustrating an assembled state of the clutch of FIG. 2.
Figure 4:
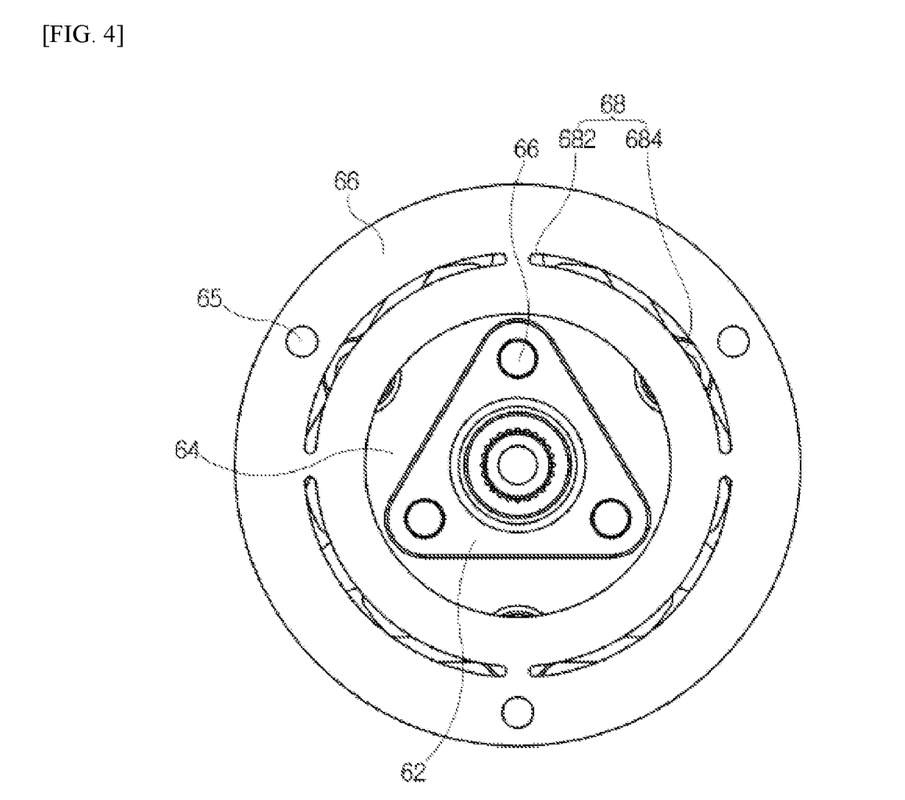
FIG. 4 is a bottom view of FIG. 3 in a state in which a pulley is removed from the clutch.
Figure 5:
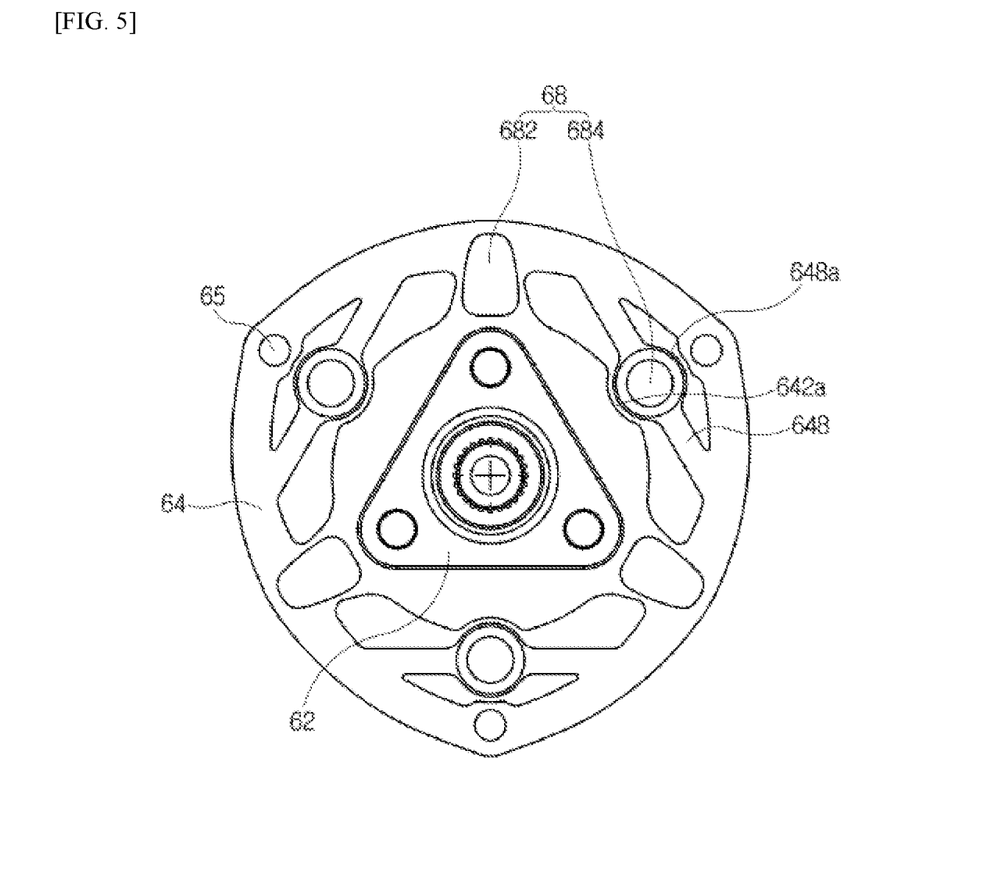
FIG. 5 is a bottom view of FIG. 3 in a state in which a pulley and a disk are removed from the clutch.
Figure 6:
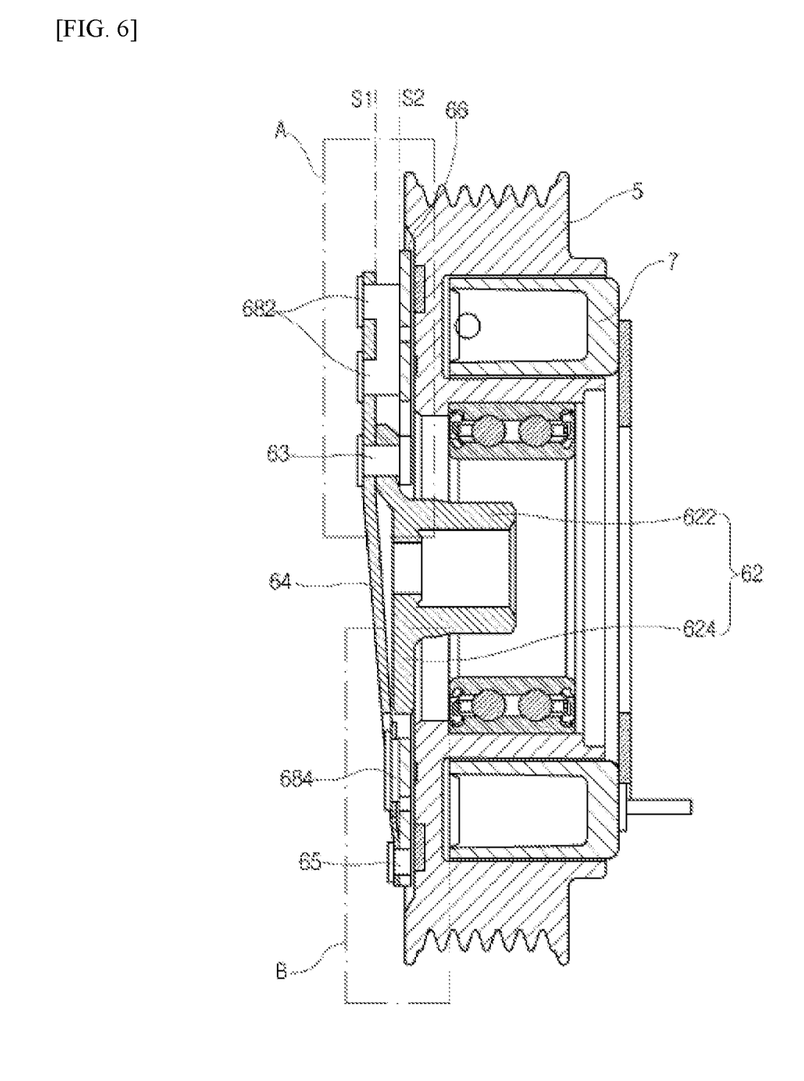
FIG. 6 is a cross-sectional view taken along line I-I of FIG. 3.
Figure 7:
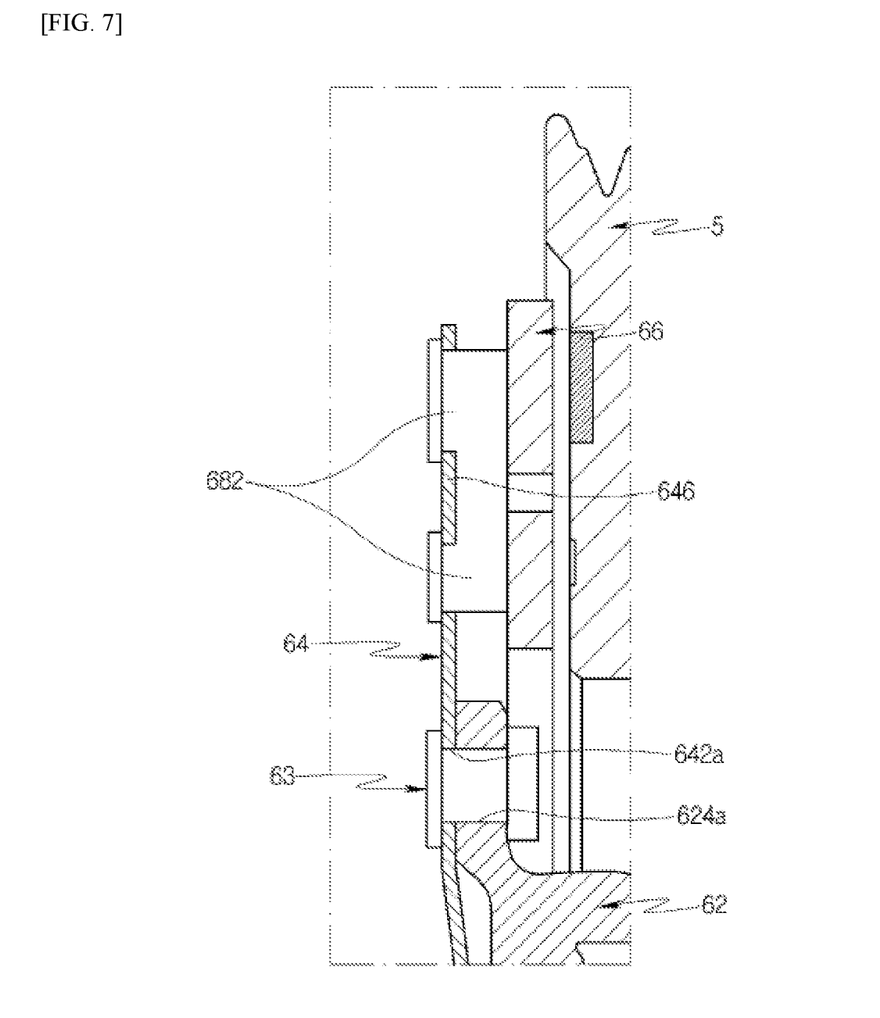
FIG. 7 is an enlarged view of portion A of the FIG. 6 in a state in which the disk and the pulley are separated from each other.
Figure 8:
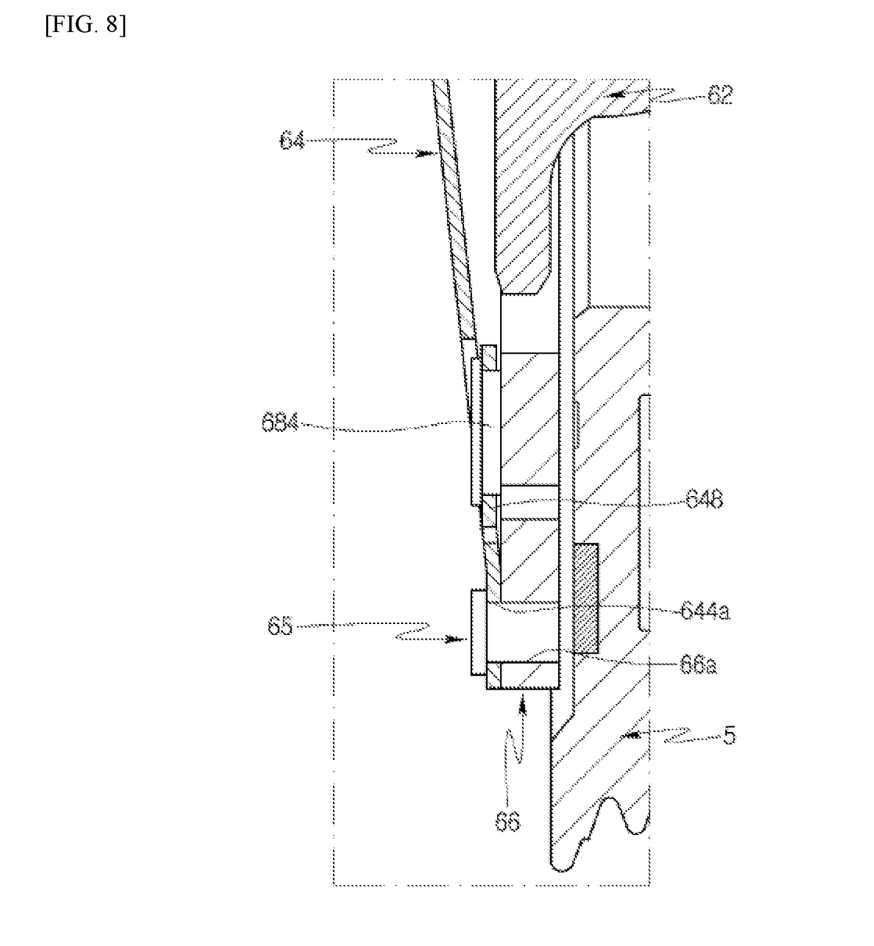
FIG. 8 is an enlarged view of portion B of the FIG. 6 in a state in which the disk and the pulley are separated from each other.
Figure 9:
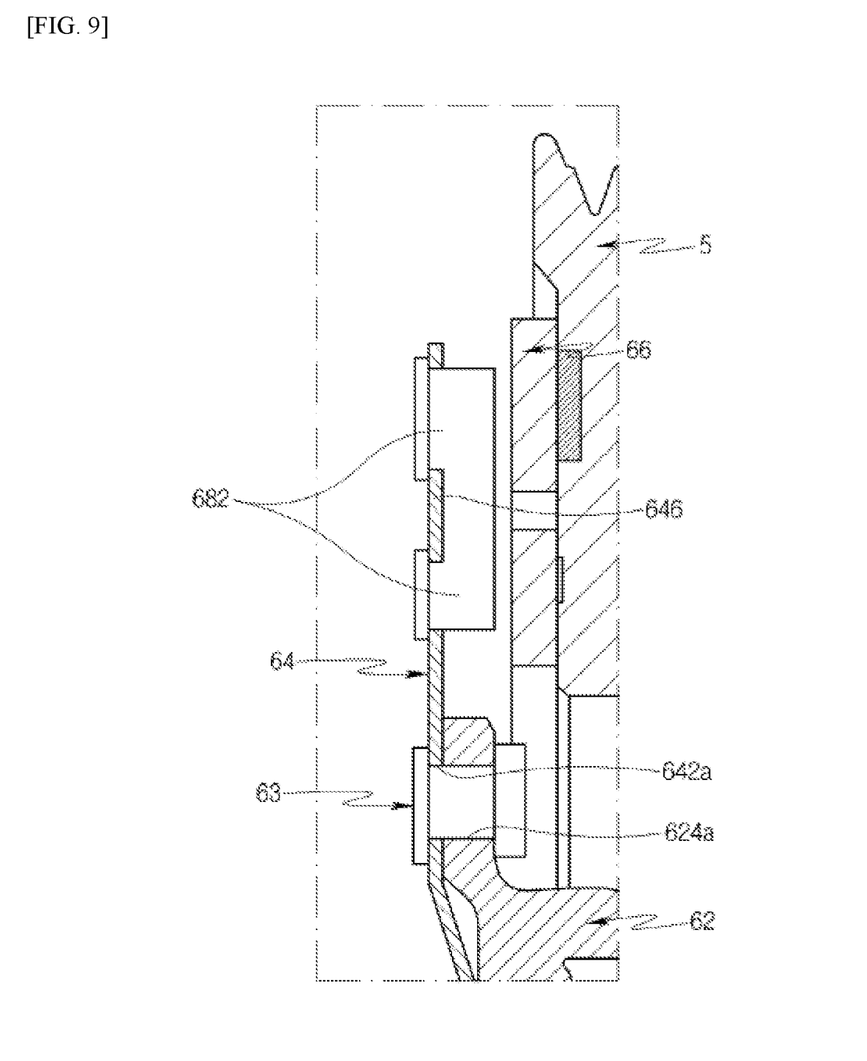
FIG. 9 is an enlarged view of portion A of the FIG. 6 in a state in which the disk and the pulley are in contact with each other.
Figure 10:
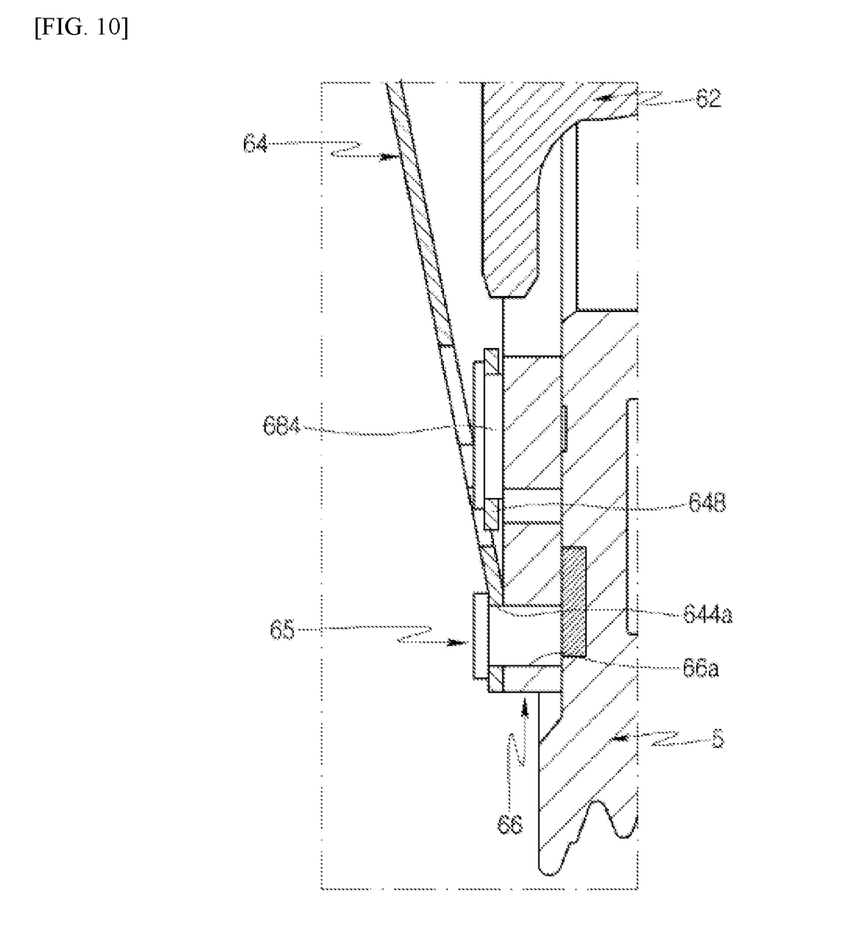
FIG. 10 is an enlarged view of portion B of the FIG. 6 in a state in which the disk and the pulley are in contact with each other.

FIG. 1 is a cross-sectional view illustrating a compressor including a clutch. FIG. 2 is an exploded perspective view illustrating a clutch according to an embodiment of the present disclosure. FIG. 3 is a top view illustrating an assembled state of the clutch of FIG. 2. FIG. 4 is a bottom view of FIG. 3 in a state in which a pulley is removed from the clutch. FIG. 5 is a bottom view of FIG. 3 in a state in which a pulley and a disk are removed from the clutch. FIG. 6 is a cross-sectional view taken along line I-I of FIG. 3. FIG. 7 is an enlarged view of portion A of the FIG. 6 in a state in which the disk and the pulley are separated from each other. FIG. 8 is an enlarged view of portion B of the FIG. 6 in a state in which the disk and the pulley are separated from each other. FIG. 9 is an enlarged view of portion A of the FIG. 6 in a state in which the disk and the pulley are in contact with each other. FIG. 10 is an enlarged view of portion B of the FIG. 6 in a state in which the disk and the pulley are in contact with each other.

Referring to FIGS. 1 to 10, a compressor according to an embodiment of the present disclosure may include a casing 1, a compression mechanism 2 provided inside the casing 1 to compress a refrigerant, a rotary shaft 3 for transmitting a rotational force to the compression mechanism 2 from a drive source (not shown) (for example, an engine) provided outside the casing 1, and a power transmission mechanism for selectively connecting and disconnecting the drive source and the rotary shaft 3.

The compression mechanism 2 may include a piston 21 reciprocatably provided in the bore of the casing 1, and a swash plate 22 fastened to the rotary shaft 3 to rotate together therewith for reciprocating the piston 21. Although the compression mechanism 2 is formed in a swash plate manner including the piston 21 and the swash plate 22 in the present embodiment, it may be formed in various manners such as in a scroll manner including an orbiting scroll orbited by the rotational force transmitted from a rotary shaft and a fixed scroll engaged to the orbiting scroll.

The rotary shaft 3 may be fastened to a disk/hub assembly 6, which will be described later, of the power transmission mechanism in such a manner that one end of the rotary shaft 3 is connected to the compression mechanism 2 and the other end thereof protrudes outside the casing 1 therethrough.

The power transmission mechanism may be an electric clutch (hereinafter, referred to as a clutch) 4, which is magnetized when electric power is applied thereto to connect the drive source and the rotary shaft 3, whereas it is demagnetized when the electric power applied thereto is interrupted to disconnect the drive source and the rotary shaft 3.

The clutch 4 may include a pulley 5 that is rotated by the power transmitted from the drive source, a disk/hub assembly 6 that is fastened to the rotary shaft 3 and selectively comes into contact with and separates from the pulley 5, and a field coil assembly 7 that is magnetized when electric power is applied thereto to make contact between the pulley 5 and the disk/hub assembly 6.

The pulley 5 has a substantially annular shape. A drive belt (not shown) may be wound around the outer peripheral surface of the pulley 5 to transmit a driving force from the drive source to the pulley 5, and a bearing may be interposed between the inner peripheral surface of the pulley 5 and the outer surface of the casing 1 to rotatably support the pulley 5.

The pulley 5 may have a friction surface formed on one side thereof so that the friction surface comes into contact with a disk 66, which will be described later, of the disk/hub assembly 6, and a field coil assembly receiving groove formed on the other side thereof so that the field coil assembly 7 is inserted into the field coil assembly receiving groove.

The disk/hub assembly 6 may include a hub 62 that is fastened to the rotary shaft 3 to be rotatable together therewith in the state in which the position of the hub 62 is fixed, a disk 66 that is fastened to the hub 62 to be rotatable together therewith and selectively comes into contact with and separates from the pulley 5, and an elastic member 64 that fastens the hub 62 and the disk 66.

The elastic member 64 may fasten the hub 62 and the disk 66 in such a manner that the elastic member 64 is fastened to the hub 62 at one side thereof by a first fastening member 63 such as a rivet and is fastened to the disk 66 at the other side thereof by a second fastening member 65 such as a rivet.

The hub 62 may include a boss 622 into which the rotary shaft 3 is inserted, and a flange 624 extending from the boss 622.

The flange 624 is formed with a hub side fastening hole 624a into which the first fastening member 63 is inserted. The hub side fastening hole 624a may consist of three hub side fastening holes 624a arranged circumferentially at regular intervals.

Here, the first fastening member 63, the second fastening member 65, the hub side fastening hole 624a, a disk side fastening hole 66a to be described later, a first annular portion side fastening hole 642a to be described later, a second annular portion side fastening hole 644a to be described later, a first fastening portion P11 to be described later, a second fastening portion P21 to be described later, a first bridge 646 to be described later, a second bridge 648 to be described later, a first attenuation member 682 to be described late, and a second attenuation member 684 to be described later may each consist of three pieces, but the number thereof may be appropriately adjusted.

The disk 66 may have an annular shape for accommodation of the hub 62.

The disk 66 is formed with a disk side fastening hole 66a into which the second fastening member 65 is inserted. The disk side fastening hole 66a may consist of three disk side fastening holes 66a arranged circumferentially at regular intervals.

The elastic member 64 may support the disk 66 such that the disk 66 is movable toward or away from the pulley 5 with respect to the hub 62, the position of which is fixed, by coupling with the rotary shaft.

The elastic member 64 may apply an elastic force to the disk 66 in a direction in which the disk 66 is away from the pulley 55 to separate the disk 66 and the pulley 5 when the electric power applied to the field coil assembly 7 is interrupted.

The disk/hub assembly 6 of the present embodiment may further include an attenuation member 68 for attenuating noise and vibration due to the contact between the disk 66 and the pulley 5, and the elastic member 64 and the attenuation member 68 may have a predetermined shape.

Specifically, noise and vibration may be caused by the collision between the pulley 5 and the disk 66 when the pulley 5 and the disk 66 come into contact with each other, and the noise and vibration due to the collision may be transferred to the compressor through the disk 66, the elastic member 64, and the hub 62. The noise and vibration caused by the driving of the pulley 5 may be transferred to the compressor through the disk 66, the elastic member 64, and the hub 62 while the pulley 5 and the disk 66 come into contact with each other and rotate together. Noise and vibration may be caused by the collision between the disk 66 and the elastic member 64 when the disk 66 is separated from the pulley 5 in the state in which the disk 66 is in contact with the pulley 5. The noise and vibration due to the contact or separation between the disk 66 and the pulley 5 may not only cause an uncomfortable feeling to a user but may adversely affect the behavior of the compressor.

In view of this, the attenuation member 68 is further provided to attenuate the noise and vibration due to the contact or separation between the disk 66 and the pulley 5 in the present embodiment. The elastic member 64 and the attenuation member 68 may be formed to reduce the noise and vibration due to the collision when the disk 66 comes into contact with the pulley 5, the noise and vibration transferred from the disk 66 to the elastic member 64 during the contact between the disk 66 and the pulley 5, and the noise and vibration due to the collision when the disk 66 is separated from the pulley 5.

In more detail, the elastic member 64 may include a first annular portion 642 that has an annular shape concentric with the hub 62 and is fastened to the hub 62, a second annular portion 644 that has an annular shape for accommodation of the first annular portion 642 and is fastened to the disk 66, a first bridge 646 that extends from the first annular portion 642 to the second annular portion 644, and a second bridge 648 that extends from one side of the second annular portion 644 to the other side of the second annular portion 644.

The first annular portion 642 may be formed to cover a space between the hub 62 and the disk 66. That is, the first annular portion 642 may have an outer diameter greater than the inner diameter of the disk 66, and the space between the hub 62 and the disk 66 may be formed within the first annular portion 642.

The first annular portion 642 is formed with a first annular portion side fastening hole 642a into which the first fastening member 63 is inserted. The first annular portion side fastening hole 642a may consist of three first annular portion side fastening holes 642a that face the hub side fastening holes 624a and are arranged circumferentially at regular intervals.

The second annular portion 644 may be formed to cover the outer peripheral portion of the disk 66.

The second annular portion 644 is formed with a second annular portion side fastening hole 644a into which the second fastening member 65 is inserted. The second annular portion side fastening hole 644a may consist of three second annular portion side fastening holes 644a that face the disk side fastening holes 66a and are arranged circumferentially at regular intervals.

In this case, when the portion of the elastic member 64, which is formed with the first annular portion side fastening hole 642a and fastened to the hub 62, is referred to as a first fastening portion P11, and the portion of the elastic member 64, which is formed with the second annular portion side fastening hole 644a and fastened to the disk 66, is referred to as a second fastening portion P21, each of the first and second fastening portions P11 and P21 may consist of three pieces and the three first fastening portions P11 and the three second fastening portions P21 may be formed so as not to radially overlap with each other. That is, the three first fastening portions P11 may be arranged circumferentially at regular intervals, the three second fastening portions P21 may be arranged circumferentially at regular intervals, the portion between an arbitrary one of the three first fastening portions P11 and a first fastening portion P11 adjacent to the arbitrary first fastening portion P11 (hereinafter, referred to as a first intermediate portion P12) may radially overlap with an associated one of the three second fastening portions P21, and the portion between an arbitrary one of the three second fastening portions P21 and a second fastening portion P21 adjacent to the arbitrary second fastening portion P21 (hereinafter, referred to as a second intermediate portion P22) may radially overlap with an associated one of the three first fastening portions P11. Here, the first intermediate portion P12 means an intermediate portion between two first fastening portions P11 adjacent to each other in the circumferential direction of the first annular portion 642 and the second intermediate portion P22 means an intermediate portion between two second fastening portions P21 adjacent to each other in the circumferential direction of the second annular portion 644.

The first bridge 646 may consist of three first bridges, and an arbitrary one of the three first bridges 646 may radially overlap with an associated one of the first fastening portions P11 and an associated one of the three second intermediate portions P22. That is, each of the first bridges 646 may extend from the associated first fastening portion P11 to the associated second intermediate portion P22.

The second bridge 648 may consist of three second bridges, and an arbitrary one of the three second bridges 648 may radially overlap with an associated one of the second fastening portions P21 and an associated one of the three first intermediate portions P12. In this case, each of the second bridges 648 may extend from one side of the associated second fastening portion P21 to the other side thereof in a direction perpendicular to the radial direction thereof.

The attenuation member 68 may include a first attenuation member 682 interposed between the first bridge 646, the second intermediate portion P22, and the disk 66, and a second attenuation member 684 interposed between the second bridge 648 and the disk 66.

The first attenuation member 682 may be coupled to the first bridge 646 and the second intermediate portion P22, and may come into contact with and separate from the disk 66. That is, the first attenuation member 682 may come into contact with both of the elastic member 64 and the disk 66 during a period in which the electric power applied to the field coil assembly 7 is interrupted so that the disk 64 and the pulley 5 are separated from each other (hereinafter, referred to as a separation period), whereas the first attenuation member 682 may come into contact with the elastic member 64 but be separated from the disk 66 during a period in which electric power is applied to the field coil assembly 7 so that the disk 66 and the pulley 5 are in contact with each other (hereinafter, referred to as a contact period).

The second attenuation member 684 may be coupled to the second bridge 648, and may come into contact with the disk 66. That is, the second attenuation member 684 may always come into contact with both of the elastic member 64 and the disk 66 (during the separation period and the contact period).

The field coil assembly 7 may include a coil housing, and a coil that is accommodated in the coil housing and generates an electromagnetic force when electric power is applied thereto.

The compressor having the above conFIGuration according to the present embodiment may operate as follows.

That is, the pulley 5 may be rotated by the driving force transmitted from the drive source.

In this state, when electric power is applied to the coil, the disk 66 may be moved toward the pulley 5 by the attractive force caused by the magnetic induction of the coil and come into contact with the pulley 5. That is, by coupling between the disk 66 and the pulley 5, the power of the drive source may be transmitted to the rotary shaft 3 through the pulley 5, the disk 66, the elastic member 64, and the hub 62. The rotary shaft 3 may operate the compression mechanism 2 by the power transmitted thereto to compress a refrigerant.

On the other hand, when the application of electric power to the coil is interrupted, the attractive force by the magnetic induction of the coil may not be generated anymore and the disk 66 may be moved away from the pulley 5 by the elastic member 64 to be separated from the pulley 5. That is, the power transmission from the drive source to the rotary shaft 3 may be interrupted. The operation of the compression mechanism 2 may be stopped and the compression of the refrigerant may be stopped.

In the clutch 4 and the compressor including the same according to the present embodiment, since the clutch 4 includes the elastic member 64 and the attenuation member 68, it is possible to reduce noise and vibration due to the contact and separation between the disk 66 and the pulley 5.

Specifically, the first attenuation member 682 can reduce the noise and vibration caused by the collision between the disk 66 and the pulley 5 at a time when electric power is applied to the field coil assembly 7 so that the disk 66 and the pulley 5 come into contact with each other (hereinafter, referred to as a contact time). In more detail, the first attenuation member 682 may allow a contact surface S2 between the elastic member 64 and the disk 66 and a contact surface S1 between the elastic member 64 and the hub 62 to be disposed on different planes by the thickness of the first attenuation member 682. In this case, since the first attenuation member 682 is formed in the elastic member 64, particularly in the first bridge 646 and the second intermediate portion P22, the first attenuation member 682 may separate the contact surface S2 between the elastic member 64 and the disk 66 toward the pulley 5 from a position such as the contact surface S1 between the elastic member 64 and the hub 62 during the separation period. That is, the first attenuation member 682 may impart initial bending deformation to the elastic member 64 during the separation period. The first attenuation member 682 can reduce the impulse between the disk 66 and the pulley 5 at the contact time by increasing the elastic force applied to the disk 66 by the elastic member 64 (a force acting in a direction in which the disk 66 is away from the pulley 5) during the contact period including the contact time. Thus, the first attenuation member 682 can reduce the noise and vibration caused by the collision between the disk 66 and the pulley 5 at the contact time.

Meanwhile, the first attenuation member 682 can improve the responsiveness of the clutch 4. That is, the increase in elastic force of the elastic member 64 by the first attenuation member 682 allows the disk 66 to be separated from the pulley 5 at a higher speed at the time of changing from the contact period to the separation period. Thus, it is possible to further improve the responsiveness of the clutch 4.

In addition, the first attenuation member 682 can reduce the noise and vibration caused by the collision between the elastic member 64 and the disk 66 at a time when the electric power applied to the field coil assembly 7 is interrupted so that the disk 66 is separated from the pulley 5 (hereinafter, referred to as a separation time). That is, the first attenuation member 682, which is separated from the disk 66 during the contact period, comes into contact with the disk 66 again during the separation period including the separation time. Thus, it is possible to prevent the collision between the disk 66 and the elastic member 64 and to relieve the impact transferred to the elastic member 64 by the repulsive force of the disk 66.

Meanwhile, since the first attenuation member 682 is separated from the disk 66 during the contact period, the first attenuation member 682 may not attenuate the noise and vibration transferred from the disk 66 to the elastic member 64 during the contact period.

In view of this, the second attenuation member 684, which is always in contact with the second bridge 648 and the disk 66 (during the contact period and the separation period), is provided in the present embodiment. Since the second attenuation member 684 compensates for the first attenuation member 682, it is possible to more effectively reduce the noise and vibration due to the contact and separation between the disk 66 and the pulley 5. That is, since the second attenuation member 684 is always in contact with the elastic member 64 and the disk 66 (during the contact period and the separation period) unlike the first attenuation member 682, it is possible to more effectively prevent the noise and vibration caused by the collision between the disk 66 and the pulley 5 at the contact time from being transferred to the compressor through the elastic member 64 and the hub 62, to prevent the noise and vibration transferred from the pulley 5 to the disk 66 during the contact period from being transferred to the compressor through the elastic member 64 and the hub 62, and to more effectively prevent the noise and vibration caused by the collision between the disk 66 and the elastic member 64 at the separation time from being transferred to the compressor through the elastic member 64 and the hub 62.

Here, since the second attenuation member 684 is formed in the elastic member 64, particularly in the second bridge 648, the second attenuation member 684 may always and stably come into contact with the elastic member 64 and the disk 66 (during the contact period and the separation period). That is, since the second bridge 648 is formed in a direction perpendicular to the radial direction thereof between the second fastening portion P21 and the first intermediate portion P12, the second bridge 648 may be significantly curved toward the disk 66 during the separation period, and the second bridge 648 may be somewhat unfolded but still maintained in the state in which it is curved toward the disk 66 during the contact period. Thus, the second attenuation member 684 formed in the second bridge 648 may be compressed between the second bridge 648 and the disk 66 and may stably come into contact with both of the elastic member 64 and the disk 66 during the separation period. Even during the contact period, the second attenuation member 684 may be compressed between the second bridge 648 and the disk 66 and may stably come into contact with both of the elastic member 64 and the disk 66.

Since the second attenuation member 684 is formed in the second bridge 648, particularly in an enlarged portion 648a which is wider than the other portions of the second bridge 648 at the center thereof, it is possible to further improve a damping force. That is, since the spring constant of the second bridge 648 is increased by the enlarged portion 648a and the area of the second attenuation member 684 is formed to be equal to that of the enlarged portion 648a, the damping force of the second attenuation member 684 can be further improved. In this case, the first annular portion 642 may include a tensioning portion 642a that is concavely formed at a position opposite to the enlarged portion 648a (at the first intermediate portion P12) such that the interference with the enlarged portion 648a is prevented and the area of the enlarged portion 648a and the second attenuation member 684 is further increased.

In the clutch 4 and the compressor including the same according to the present embodiment, the space between the hub 62 and the disk 66 is covered by the elastic member 64 without using a separate plate member. Thus, it is possible to prevent introduction of foreign substances through the space between the hub 62 and the disk 66 and suppress an increase in cost and weight.

Although the first attenuation member 682 is interposed between the first bridge 646 and the disk 66 and between the second intermediate portion P22 and the disk 66 in the present embodiment, the present disclosure is not limited thereto. That is, the first attenuation member 682 may be interposed only between the first bridge 646 and the disk 66. Alternatively, the first attenuation member 682 may be interposed only between the second intermediate portion P22 and the disk 66.

Although the first attenuation member 682 is coupled to the first bridge 646 and the second intermediate portion P22 and is formed to come into contact with and separate from the disk 66 in the present embodiment, the present disclosure is not limited thereto. That is, the first attenuation member 682 may be coupled to the disk 66 and may be formed to come into contact with and separate from the first bridge 646 and the second intermediate portion P22.

Although the second attenuation member 684 is coupled to the second bridge 648 and comes into contact with the disk 66 in the present embodiment, the present disclosure is not limited thereto. That is, the second attenuation member 684 may be coupled to the disk 66 and comes into contact with the second bridge 648.

In the present embodiment, the disk 66 and the pulley 5 come into contact with each other when the field coil assembly 7 is magnetized and the disk 66 and the pulley 5 are separated from each other when the field coil assembly 7 is demagnetized. That is, the field coil assembly 7 is magnetized when electric power is applied thereto to move the disk 66 toward the pulley 5 and make contact between the disk 66 and the pulley 5, and the elastic member 64 applies an elastic force to the disk 66 in a direction in which the disk 66 is away from the pulley 5. However, the present disclosure is not limited thereto. For example, the disk 66 and the pulley 5 may be separated from each other when the field coil assembly 7 is magnetized and the disk 66 and the pulley 5 may come into contact with each other when the field coil assembly 7 is demagnetized. That is, the field coil assembly 7 may be magnetized when electric power is applied thereto to move the disk 66 away from the pulley 5 and separate the disk 66 and the pulley 5, and the elastic member 64 may apply an elastic force to the disk 66 in a direction in which the disk 66 is close to the pulley 5.

INDUSTRIAL APPLICABILITY

The present disclosure provides a clutch capable of reducing noise and vibration due to contact and separation between a pulley and a disk, and a compressor including the same.

The invention claimed is:
1. A clutch comprising:
a hub fastened to a rotary shaft of a compressor to be rotatable together with the rotary shaft in a state in which a position of the hub is fixed;
a disk fastened to the hub to be rotatable together therewith;
a pulley rotated by power transmitted from a drive source of the compressor;
an elastic member for fastening the hub and the disk such that the disk is movable toward or away from the pulley with respect to the hub;
a field coil assembly magnetized when electric power is applied thereto to allow the disk and the pulley to come into contact with or separate from each other; and
an attenuation member interposed between the elastic member and the disk,
wherein the elastic member and the attenuation member reduce noise and vibration due to contact and separation between the disk and the pulley while reducing noise and vibration, and
wherein the attenuation member includes a first attenuation member coming into contact with the disk and the elastic member during a separation period between the disk and the pulley and separated from one of the disk and the elastic member during a contact period between the disk and the pulley; and a second attenuation member coming into contact with the disk and the elastic member during the contact period and the separation period between the disk and the pulley.

2. The clutch according to claim 1, wherein the elastic member comprises:
a first annular portion fastened to the hub;
a second annular portion having an annular shape for accommodation of the first annular portion and fastened to the disk;
a first bridge extending from the first annular portion to the second annular portion; and
a second bridge extending from one side of the second annular portion to the other side of the second annular portion.

3. The clutch according to claim 2, wherein:
the first annular portion comprises first plurality fastening portions arranged circumferentially at regular intervals and fastened to the hub, and first plurality intermediate portions interposed between the first plurality fastening portions;
the second annular portion comprises second plurality fastening portions arranged circumferentially at regular intervals and fastened to the disk, and second plurality intermediate portions interposed between the second plurality fastening portions;
an arbitrary one of the first plurality intermediate portions radially overlaps with an associated one of the second plurality fastening portions; and
an arbitrary one of the second plurality intermediate portions radially overlaps with an associated one of the first plurality fastening portions.

4. The clutch according to claim 3, wherein:
the first bridge consists of first plurality bridges; and
an arbitrary one of the first plurality bridges radially overlaps with an associated one of the first plurality fastening portions and an associated one of second plurality intermediate portions.

5. The clutch according to claim 4, wherein each of the first bridges radially extends from the associated first fastening portion to the associated second intermediate portion.

6. The clutch according to claim 5, wherein the first attenuation member is interposed between the disk and at least one of the first bridge and the second intermediate portion.

7. The clutch according to claim 6, wherein the first attenuation member separates a contact surface between the elastic member and the disk toward the pulley from a position such as a contact surface between the elastic member and the hub during the separation period between the disk and the pulley.

8. The clutch according to claim 3, wherein:
the second bridge consists of second plurality bridges; and
an arbitrary one of the second plurality bridges radially overlaps with an associated one of the second plurality fastening portions and an associated one of the first plurality intermediate portions.

9. The clutch according to claim 8, wherein each of the second brides extends from one side of the associated fastening portion to the other side thereof in a direction perpendicular to the radial direction thereof.

10. The clutch according to claim 9, wherein the second attenuation member is interposed between the second bridge and the disk.

11. The clutch according to claim 10, wherein:
the second bridge comprises an enlarged portion that is wider than the other portions of the second bridge; and
the second attenuation member is formed in the enlarged portion.

12. The clutch according to claim 11, wherein the first annular portion comprises a tensioning portion concavely formed at a position opposite to the enlarged portion.

13. A compressor comprising:
a casing;
a compression mechanism provided inside the casing to compress a refrigerant;
a rotary shaft for transmitting a rotational force to the compression mechanism from a drive source provided outside the casing; and
a power transmission mechanism for selectively connecting and disconnecting the drive source and the rotary shaft,
wherein the power transmission mechanism is the clutch according to claim 1.

* * * * *